United States Patent [19]
Naramura

[11] Patent Number: 5,493,958
[45] Date of Patent: Feb. 27, 1996

[54] SANDWICH PREPARATION APPARATUS

[75] Inventor: Michiyuki Naramura, Okayama, Japan

[73] Assignee: Kabushiki Kaisha Kyowa Kogyosho, Kurashiki, Japan

[21] Appl. No.: 374,291

[22] Filed: Jan. 19, 1995

[30] Foreign Application Priority Data

Feb. 24, 1994 [JP] Japan ................................ 6-026929

[51] Int. Cl.⁶ ............................ A21D 13/08; A23L 1/31; B65B 25/16; G07F 11/70
[52] U.S. Cl. ........................ 99/450.5; 99/325; 99/357; 99/443 C; 99/450.4
[58] Field of Search .................... 99/450.1, 450.2, 99/450.4, 450.5, 325, 326, 334, 352, 355, 357, 443 R, 443 C, 494; 426/274, 275; 364/477, 478, 400; 395/82; 221/150 A, 150 R, 124, 151; 219/388

[56] References Cited

U.S. PATENT DOCUMENTS

| | | | |
|---|---|---|---|
| 3,183,856 | 5/1965 | Jolly | 99/450.4 |
| 4,202,260 | 5/1980 | Weger | 99/450.4 |
| 4,685,387 | 8/1987 | Hanson et al. | 99/450.4 |
| 4,944,218 | 7/1990 | Cresson | 99/357 |
| 5,113,754 | 5/1992 | Robinson et al. | 99/326 |
| 5,365,835 | 11/1994 | Naramura | 99/450.5 |

*Primary Examiner*—Timothy F. Simone
*Attorney, Agent, or Firm*—Christopher R. Pastel; Thomas R. Morrison

[57] ABSTRACT

A sandwich preparation apparatus includes an automatic crown preparation section, an automatic heel preparation section, an automatic patty preparation section, and a manual preparation section. The automatic crown preparation section discharges individual crowns from a crown stocker and sequentially toasts them with a toasting device. The automatic heel preparation section discharges individual heels from a heel stocker and sequentially toasts them with a toasting device. The automatic patty preparation section discharges individual patties from a patty stocker and sequentially heats them with a grilling device. In the manual preparation section, prepared crowns, heels, and a patty, if necessary, are manually fixed along with other necessary food materials. The apparatus also includes conveying devices which transfer crowns, heels, and patties prepared at each section to the manual preparation section or its vicinity.

8 Claims, 12 Drawing Sheets

SANDWICH PREPARATION APPARATUS

BACKGROUND OF THE INVENTION

The present invention relates to a sandwich preparation apparatus. Conventional hamburgers have a meat patty in a bun along with various condiments and sauces. A variety of other types of hamburgers and sandwiches have been recently become popular and are in high demand at food outlets. These includes, for example, such items as teriyaki burger (adding teriyaki sauce to a conventional hamburger), bacon and lettuce burgers, cheeseburgers, fish sandwiches, chicken sandwiches and croquette sandwiches. New types and kinds of hamburgers and sandwiches are being introduced regularly. The words "hamburger" and "sandwich" are interchangeably used in this specification unless otherwise specified.

A demand for heightened productivity has arisen as a result of an increase in the number of consumers and increasingly diversified tastes. However, preparation of hamburgers and sandwiches has been mostly manually performed in conventional kitchen facilities which include a freezer for meat patties, a refrigerator for condiments, a broiler or grill for cooking food a toaster for buns, a deep fat frier, and a work table for manually fixing necessary food materials with a bun to complete a hamburger or sandwich. Each section is independent of the others. The productivity of the conventional kitchen facilities has been improved upon many times and has now reached an ultimate limit.

In order to solve the problem mentioned above, various types of automatic hamburger fixing apparatus have been developed. For example, the apparatus disclosed in the Japanese Patent Application Laid-Open No. 1-91739 attempts to overcome the problem in conventional manual systems.

The above automatic hamburger fixing apparatus is, however, designed to fix only limited kinds of hamburgers and sandwiches. In order to prepare all of the kinds of hamburgers and sandwiches listed above, an apparatus must have feeding and adding mechanisms for each and every type of food material necessary for producing the hamburgers and sandwiches. This makes the apparatus bigger and requires a large space for installation. In addition, every time a new type of sandwich or hamburger is introduced, another mechanism for feeding the new food material has to be incorporated in the existing apparatus. The control system of the apparatus must also be modified accordingly. It is impossible to install such an apparatus in a conventional, relatively small kitchen, and it is difficult to install additional mechanisms and modify the control system for feeding the new food material. This is another problem.

OBJECTS AND SUMMARY OF THE INVENTION

Accordingly, it is an object of the invention to provide a sandwich preparation apparatus which overcomes the drawbacks and limitations of the prior art.

It is an object of the present invention to provide a sandwich preparation apparatus which is capable of automatically preparing a variety of hamburgers and sandwiches.

It is a further object of the present invention to provide a sandwich preparation apparatus which is relatively small and easily installed in a conventional kitchen.

It is a still further object of the present invention to provide a sandwich preparation apparatus which increases the productivity and efficiency of these kitchens.

Briefly stated, a sandwich preparation apparatus includes an automatic crown preparation section, an automatic heel preparation section, an automatic patty preparation section, and a manual preparation section. The automatic crown preparation section discharges individual crowns from a crown stocker and sequentially toasts them with a toasting device. The automatic heel preparation section discharges individual heels from a heel stocker and sequentially toasts them with a toasting device. The automatic patty preparation section discharges individual patties from a patty stocker and sequentially heats them with a grilling device. In the manual preparation section, prepared crowns, heels, and patties, if necessary, are manually fixed along with other necessary food materials. The apparatus also includes conveying devices which transfer crowns, heels, and patties prepared at each section to the manual preparation section or its vicinity.

According to an embodiment of the invention, a sandwich preparation apparatus includes an automatic crown preparation section including a crown stocker and a crown toasting device, said automatic crown preparation section including means for discharging a crown from said crown stocker, said automatic crown preparation section including means for toasting said crown with said crown toasting device, an automatic heel preparation section including a heel stocker and a heel toasting device, said automatic heel preparation section including means for discharging a heel from said heel stocker, said automatic heel preparation section including means for toasting said heel with said heel toasting device, an automatic patty preparation section having a patty stocker and a patty grilling device, said automatic patty preparation section including means for discharging a patty from said patty stocker, said automatic patty preparation section including means for heating said patty with said grilling device, a manual preparation section, wherein a sandwich is assembled manually by assembling at least said crown, said heel, and a food material, and at least one conveying device including means for transferring at least one of said crown, said heel, and said patty from at least one of said automatic crown preparation section, said automatic heel preparation section, and said automatic patty preparation section, respectively, substantially to said manual preparation section.

According to a feature of the invention, said transferring means include at least one storage section for accumulating and storing a plurality of heels, crowns, and patties transferred by said at least one conveying device, and the invention further includes means, responsive to a removal by an operator of at least one of said plurality of heels, crowns, and patties from said at least one storage section, for replacing that removed one of said plurality of heels, crowns, and patties. The replacing means may be controlled by a CPU or by said operator.

According to another feature of the invention, the sandwich preparation apparatus further includes a conveyer unit, said conveyor unit having an upstream starting region and a downstream end region, said upstream region being near said manual preparation section, said downstream end region being at a desired position, and said conveyer unit being driven in response to an input from an operator.

According to another feature of the invention, the sandwich preparation apparatus further includes a display board for displaying a plurality of types of ordered sandwiches, and said display board includes a display responsive to an input from an operator.

According to another embodiment of the invention, a sandwich preparation apparatus includes an automatic crown preparation section including a crown stocker and a crown toasting device, said automatic crown preparation section including means for discharging a crown from said crown stocker, said automatic crown preparation section including means for toasting said crown with said crown toasting device, an automatic heel preparation section including a heel stocker and a heel toasting device, said automatic heel preparation section including means for discharging a heel from said heel stocker, said automatic heel preparation section including means for toasting said heel with said heel toasting device, an automatic patty preparation section having a patty stocker and a patty grilling device, said automatic patty preparation section including means for discharging a patty from said patty stocker, said automatic patty preparation section including means for heating said patty with said grilling device, a manual preparation section, wherein a sandwich is assembled manually by assembling at least said crown, said heel, and a food material, a crown conveying device including means for transferring said crown from said automatic crown preparation section substantially to said manual preparation section, a heel conveying device including means for transferring said heel from said automatic heel preparation section substantially to said manual preparation section, and a patty conveying device including means for transferring said patty from said automatic patty preparation section substantially to said manual preparation section.

According to a feature of the invention, a sandwich preparation apparatus further includes said crown transferring means including a storage section for accumulating and storing a plurality of crowns transferred by said crown conveying device, said heel transferring means including a storage section for accumulating and storing a plurality of heels transferred by said heel conveying device, said patty transferring means including a storage section for accumulating and storing a plurality of patties transferred by said patty conveying device, and means, responsive to a removal by an operator of one of said plurality of heels, crowns, and patties from one of said storage sections, for replacing that removed one of said plurality of heels, crowns, and patties.

The sandwich preparation apparatus may include a storage section in which a plurality of crowns, heels, and patties which have been conveyed by the conveying device are temporarily stored preceding the manual preparation section. When one of crowns, heels or patties being stored is taken out to the manual preparation section, the resultant vacant space will be replenished with another crown, heel or patty by the corresponding section automatically or by an operator's input.

The sandwich preparation apparatus may further include a conveyer unit, an upstream end region of which is disposed near the manual preparation section, and a downstream end region of which is at a desired position. The conveyer unit is driven by the operator's input.

The sandwich preparation apparatus is provided with a display board for displaying the kinds of ordered sandwiches. The display on the display board goes off in response to input by the operator.

The present invention stated above has the following advantages.

(A) Production of a Variety of Hamburgers and Sandwiches

In the apparatus according to the present invention, crowns and heels (which are always essential for sandwiches), and patties (which are essential depending on the ordered items), are toasted or heated by the corresponding automatic preparation sections, and then transferred to the manual preparation section by the conveying device.

Accordingly, the operator does not have to move around to a specific position to do a specific job, but can stay at the manual preparation section and prepare a wide variety of hamburgers and sandwiches, merely by adding necessary food materials on heels and putting crown on top.

(B) Installability in a Conventional, Relatively Small Kitchen

As described in section (A) above, a variety of sandwiches can fixed in a single system. As a result, the sandwich preparation apparatus can be small in size. Therefore, this apparatus can be installed in a conventional, rather small kitchen.

(C) Heightened Productivity

Toasting crowns and heels and grilling patties, which are cumbersome, can be automatically done by the corresponding automatic section. Crowns, heels, and patties, which have been through the respective sections, are conveyed to the manual preparation section by the conveying device.

The job the operator has to do, therefore, consists only of fixing necessary food materials with crowns, heels and patties (if necessary) which have been conveyed from each section and stored in a predetermined order for each kind of sandwich. A plurality of crowns, heels, and patties are stored and accumulated in the storage sections preceding the manual preparation section. The operator picks up required food materials and puts them together with other necessary food materials. The space in the storage sections which the picked-up materials occupied, now vacant, is filled with another food material, either automatically or by the operator's input. This eliminates idling time from waiting for the completion of toasting or grilling of crowns, heels, and patties, which are usually time-consuming.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
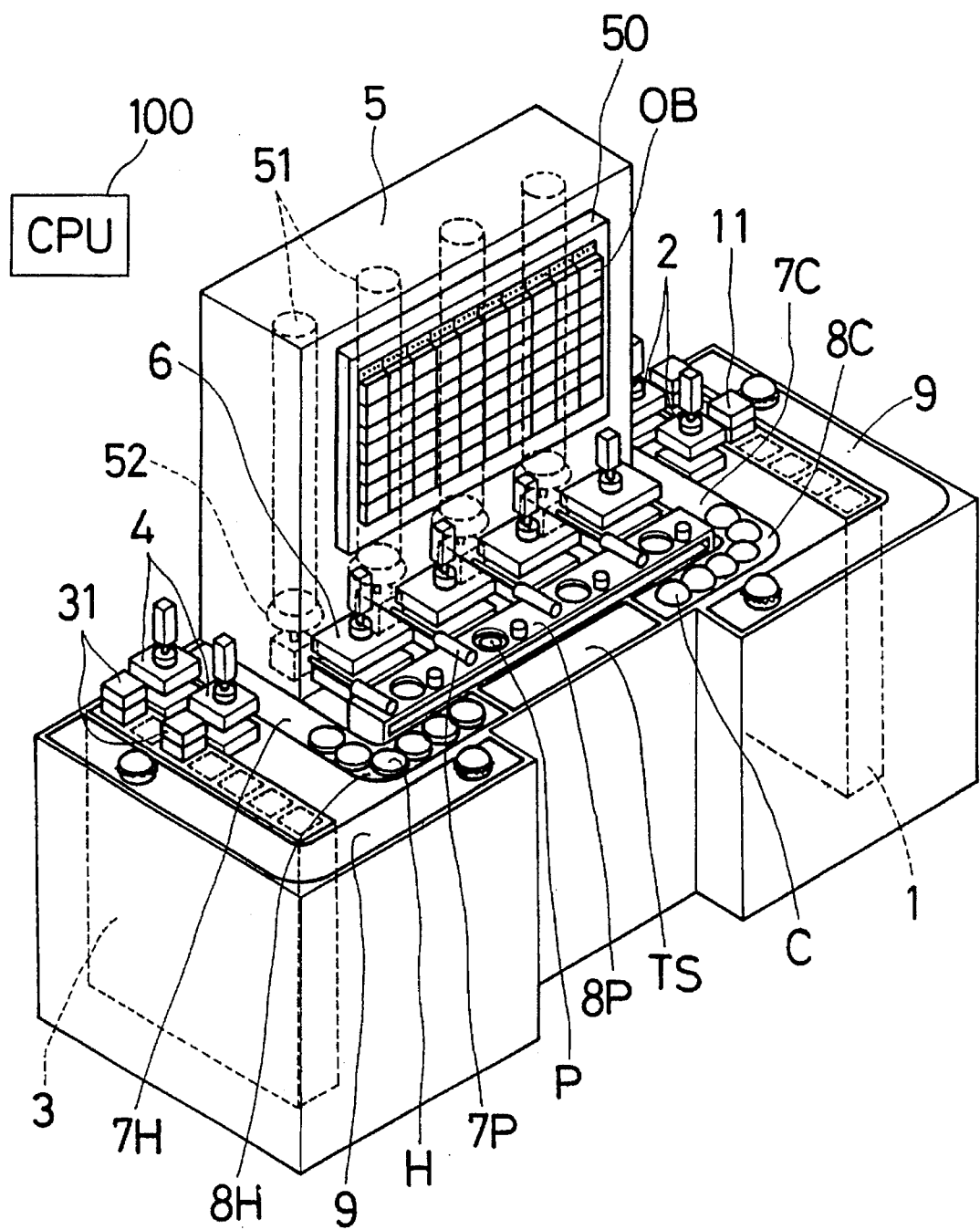
FIG. 1 is a perspective view of an embodiment of a sandwich preparation apparatus according to the present invention.
Figure 2:
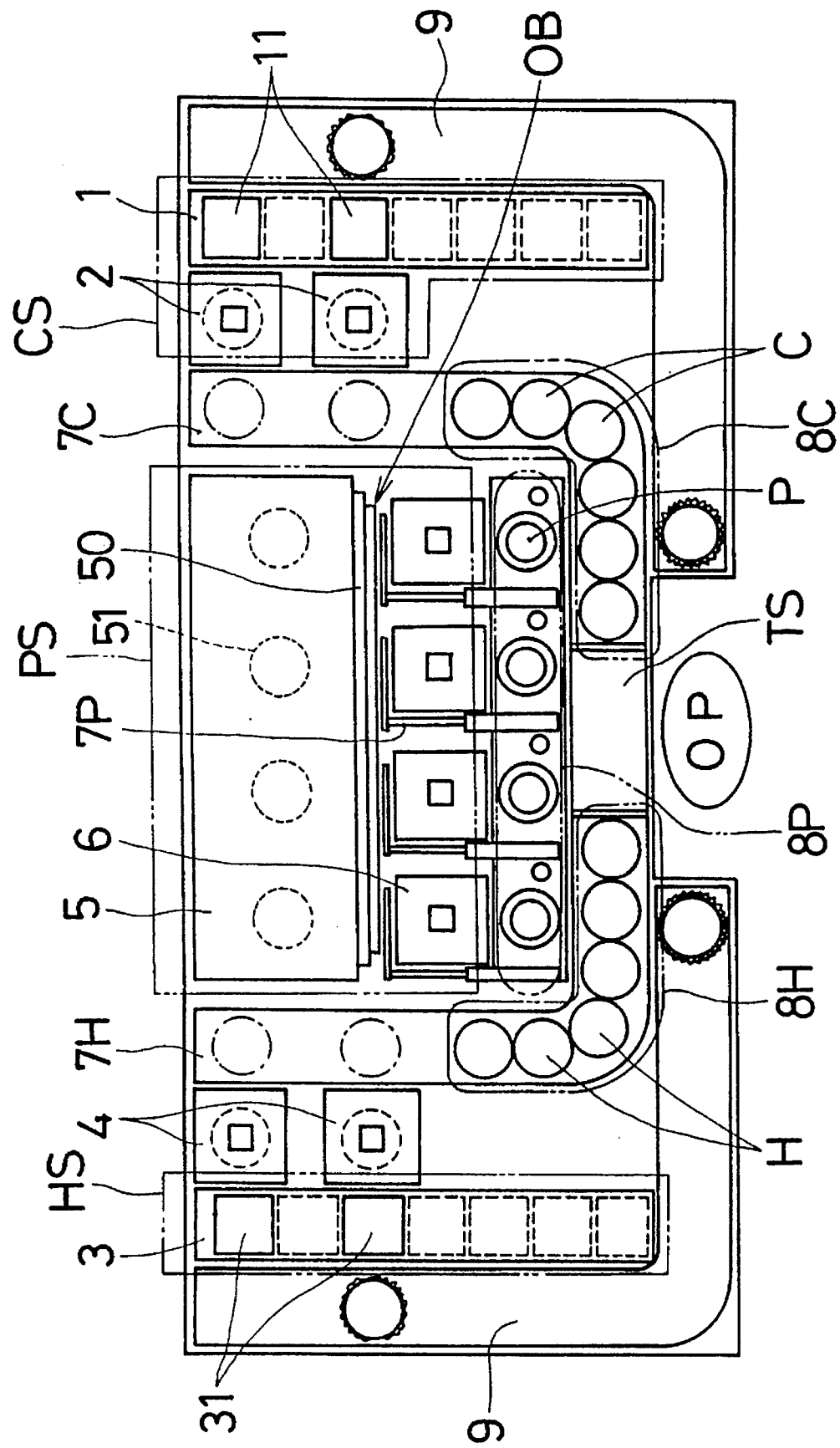
FIG. 2 is a plan view of the sandwich preparation apparatus of FIG. 1.

Referring to FIGS. 1 and 2, a sandwich preparation apparatus according to an embodiment of the present invention includes the following elements: an automatic crown preparation section CS, an automatic heel preparation section HS, an automatic patty preparation section PS, a manual preparation section TS, conveying devices 7C and 7H, shifting means 7P, storage sections 8C, 8H and 8P, a conveyer unit 9, and a display board OB. The conveying devices 7C and 7H and shifting means 7P transfer crowns C, heels H, and patties P, respectively, which have been through the respective automatic preparation sections to positions preceding the manual preparation section TS. The storage sections 8C, 8H and 8P accumulate a plurality of crowns C, heels H, and patties P transferred by the conveying devices 7C and 7H and shifting means 7P at positions preceding the manual preparation section TS. The conveyer unit 9 transfers hamburgers and sandwiches completed at the manual preparation section TS to an order counter. The display board OB visibly shows ordered items. Each section and means are described in detail below.

The Automatic Crown Preparation Section CS

Referring to FIGS. 1 and 2, the automatic crown preparation section CS discharges crowns from a crown stocker 1 one by one, and toasts these crowns in sequence with a crown toasting device 2.

Figure 3:
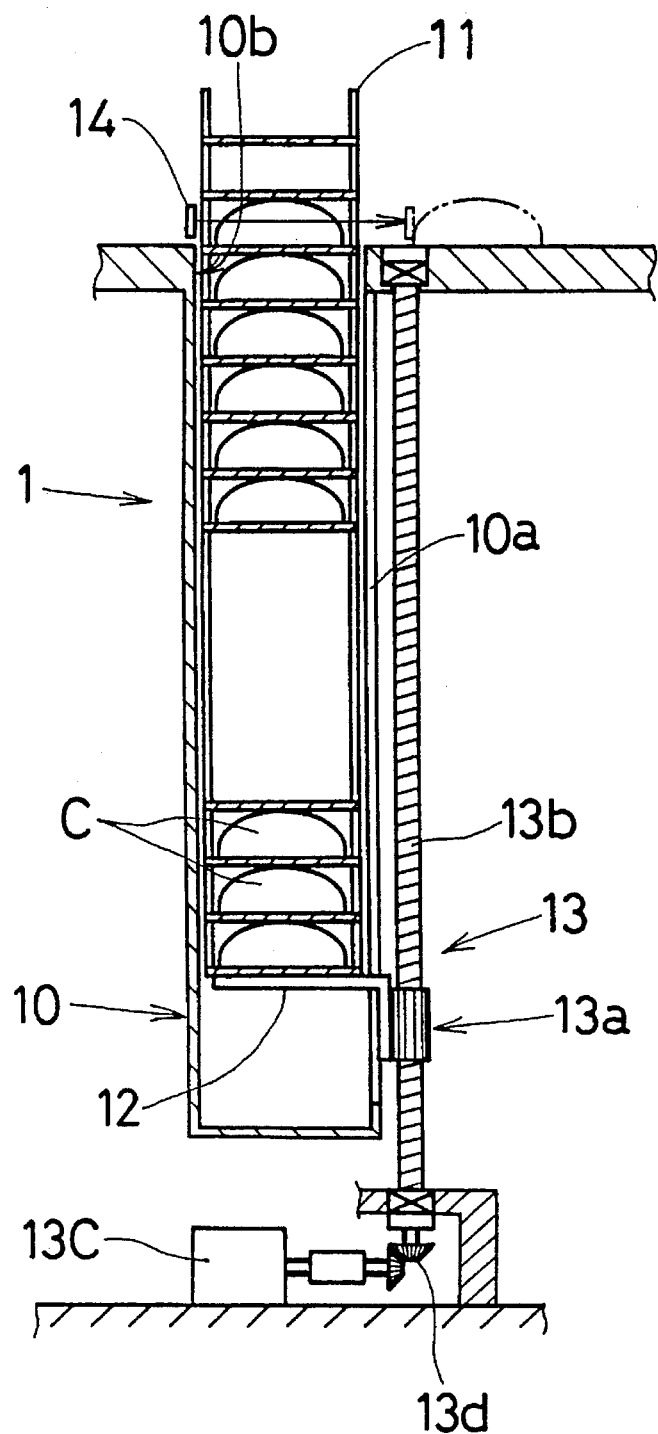
FIG. 3 is a section view of a crown stocker of the sandwich preparation apparatus of FIG. 1.

Referring also to FIG. 3, the crown stocker 1 is formed of a substantially rectangular parallelopiped box 10 and receives seven cartridges 11 therein. The box 10 has interior vertical slits 10a. An arm 12 is provided in each of the interior vertical slits 10a. Lifting up the arm 12 along the vertical slit 10a by a lifting means 13 allows the cartridge 11 to project out from an upper hole 10b of the crown stocker 1.

Figure 4:
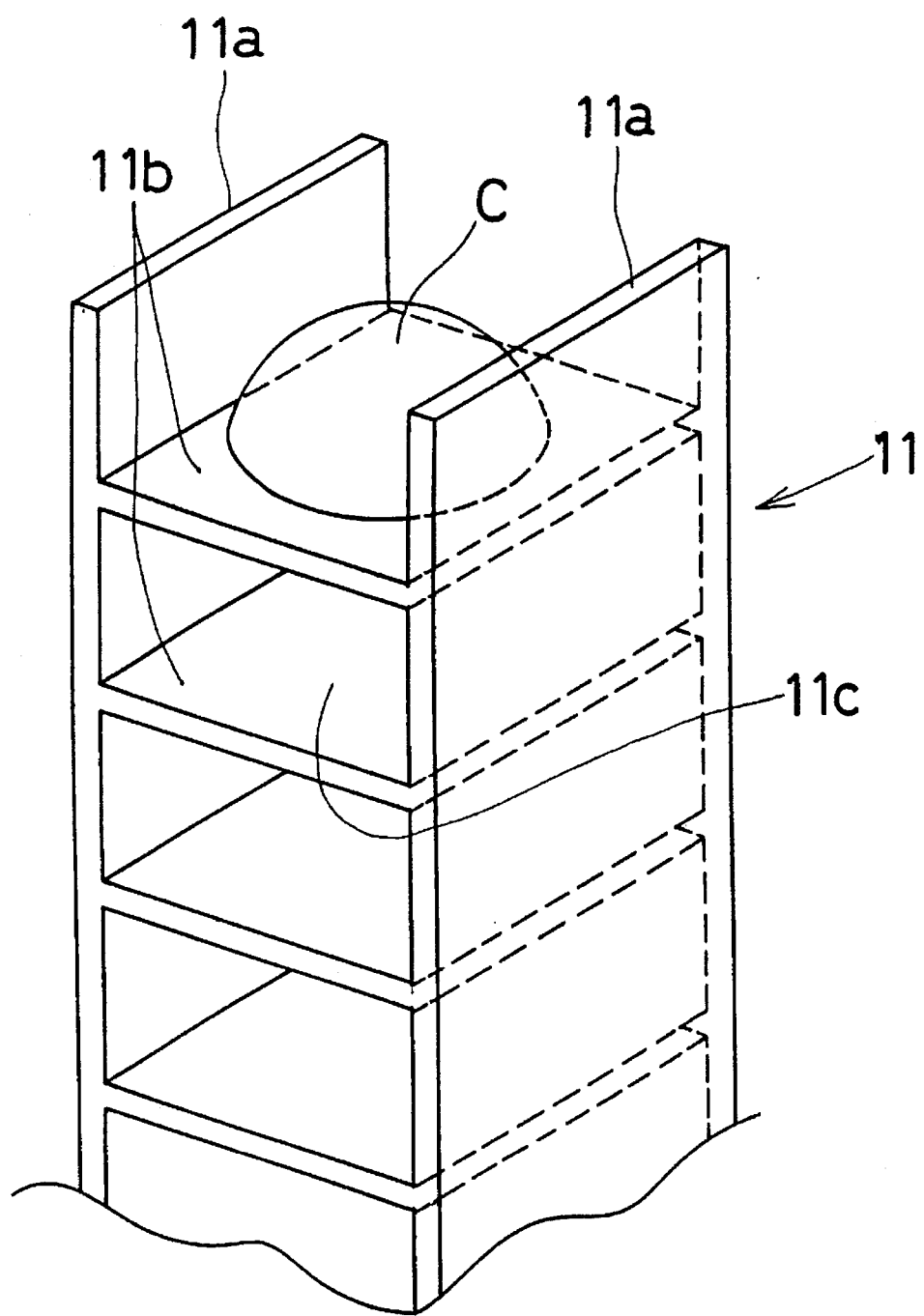
FIG. 4 is a perspective view of a cartridge to be accommodated in the crown stocker of FIG. 3.

Referring also to FIG. 4, each cartridge 11 includes a pair of vertical plates 11a and a plurality of horizontal plates 11b which are fixed to the pair of vertical plates 11a at predetermined intervals. The vertical plates 11a and every two of adjacent horizontal plates 11b define a crown receiving space 11c, which is open on the front and back. A crown C is put into or taken out from the space 11c by a reciprocating motion of a pushing arm 14 fixed to an output member of a cylinder (not shown). The lifting means 13 includes a lifting member 13a with a ball-screw unit. The arm 12 is secured to the lifting member 13a. A male screw 13b of the ball-screw unit is rotated via a gear 13d by means of a motor 13c.

Lifting movement of the cartridge 11 stops when a top face of the horizontal plate 11b aligns with a top face of the crown stocker 1. Any conventional sensing means, such as a light sensor, detects a position of the horizontal plate 11b is provided to achieve this function. When the cartridge 11 moves up to the position where the top face of the horizontal plate 11b aligns with a top face of the crown stocker 1, the pushing arm 14 is actuated to push crown C which is on the top face of the horizontal plate 11b in a space 11c to an appropriate position in the crown toasting device 2 as shown in FIG. 5.

Figure 5:
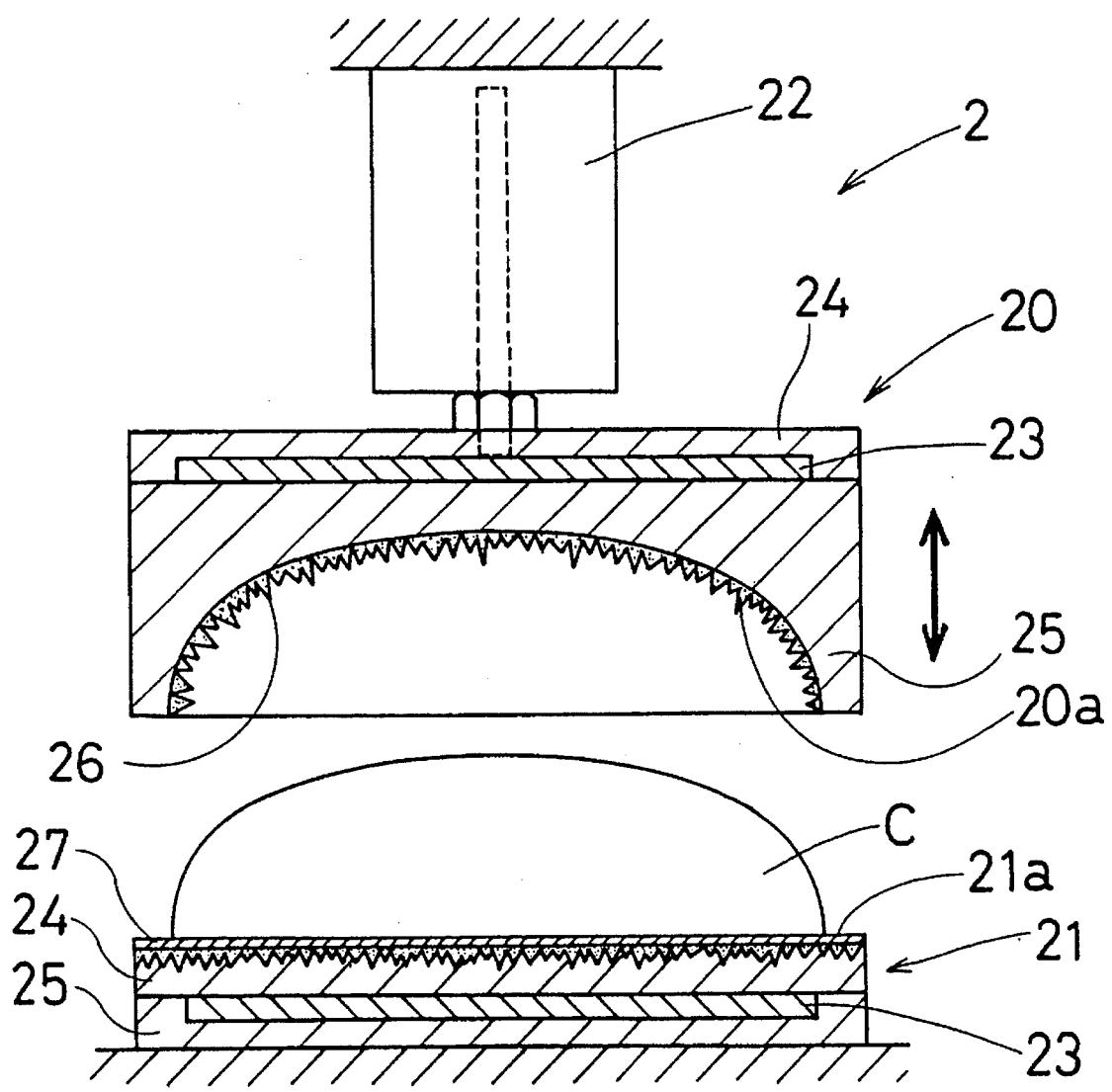
FIG. 5 is a partial section view of a crown toasting device provided in the sandwich preparation apparatus according to the present invention.

Referring to FIG. 5, the crown toasting device 2 toasts a crown by heating and pressing it between a pair of substantially parallel upper and lower heating plates 20, 21 disposed vertically. The upper heating plate 20 is moved vertically by a cylinder 22 and has a recess portion 20a in a bottom face. The recess portion 20a is formed to match the shape of a substantially hemispherical upper side of crown C. A top surface of the lower heating plate 21, which opposes the recess portion 20a, has a flat face 21a. The heating plates 20, 21 each include upper and lower metal plates 24,25 with heaters 23 inserted therebetween.

The recess portion 20a has a layer 26 of far infrared radiation substance such as alumina $Al_2O_3$. It is particularly preferable that the flat face 21a is coated with a layer 27 which is a combination of a far infrared radiation substance and a silicon or a polytetrafluoroethylene (PTFE), such as is sold under the registered trademark "TEFLON". This layer 27 exerts surface activating effect.

Methods of coating the flat face 21a are described below. Initially, a far infrared radiation substance is sprayed on the flat face 21a. A silicon coating (50 μm to 100 μm thick) is then applied thereon. A PTFE coating (several microns thick) is further added thereon. This is one example. Another method is accomplished by coating the flat face 21a with a surface activating substance, such as a mixture of powdered far infrared radiation substance and silicon or PTFE.

Accordingly, when using the toasting device 2 of the present invention, maximum effect of far infrared radiation substance can be expected, high thermal effect can be obtained and abherence of a cut-side of a crown C can be guaranteed.

Crowns C toasted by the toasting device 2 are shifted to a conveying zone on the conveying device 7C by, for example, a pushing arm fixed to an end of an output shaft of a cylinder.

The Conveying Device 7C for Crowns C

Figure 6:
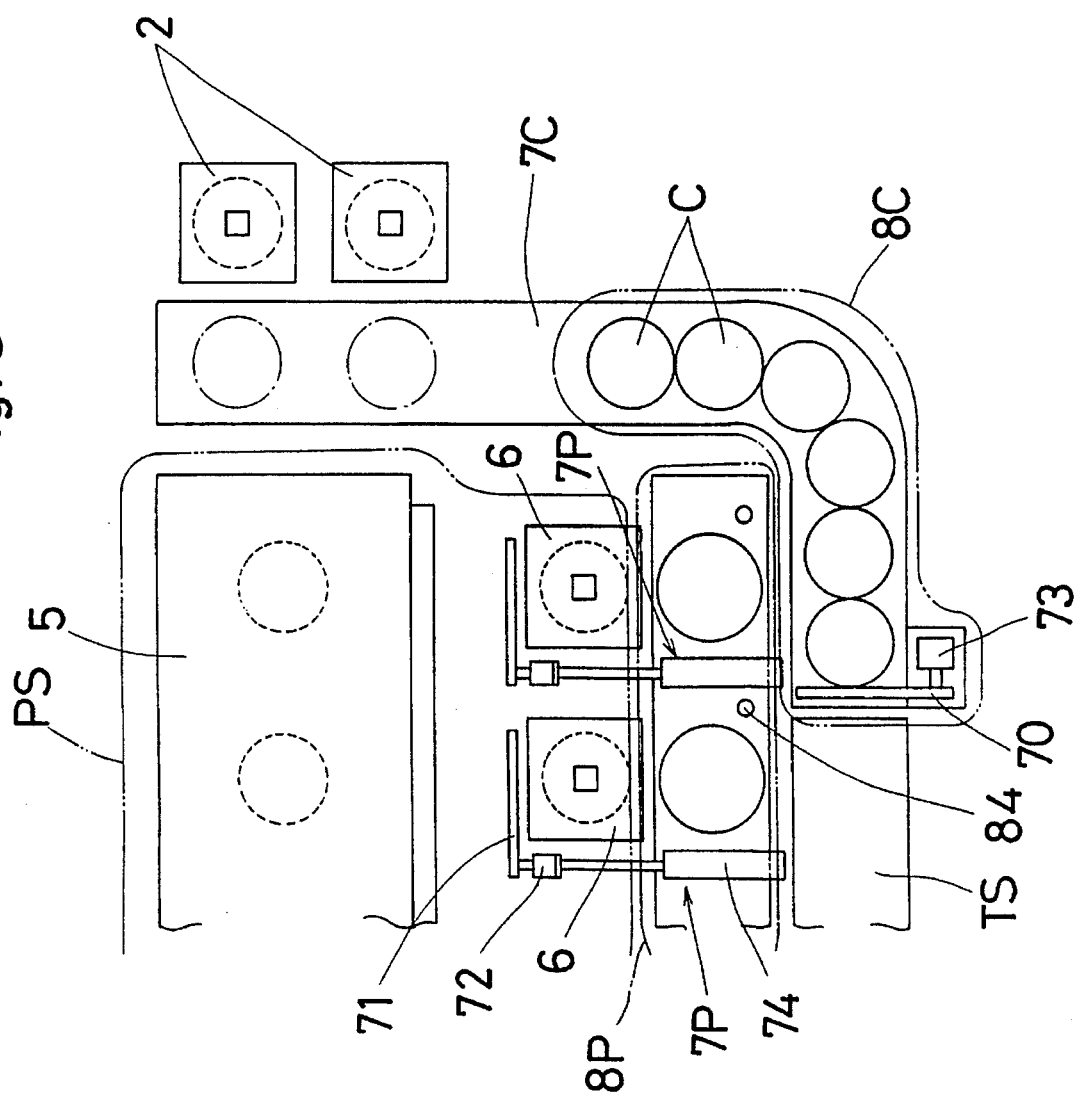
FIG. 6 is a fragmentary plan view of a storage section and means for shifting and storing food materials incorporated in the sandwich preparation apparatus according to the present invention.

Referring to FIGS. 2 and 6, the conveying device 7C includes an inverse L-shaped conveyer. Any conventional conveying means such as a belt or a series of rollers is employed. A downstream end of the conveyer is provided with a stopper 70 for stopping crowns C on the moving conveyer. The stopper 70 is automatically actuated to open and close by a torque actuator 73. When the stopper 70 is in a closed state, crowns C accumulate in a storage section 8C. In this embodiment, six crowns can accumulate and be stored in the storage section 8C.

The Automatic Heel Preparation Section HS

Referring back to FIGS. 1 and 2, the automatic heel preparation section HS discharges heels from a heel stocker 3 one by one, and toasts these heels in sequence with a heel toasting device 4.

The heel stocker 3 is formed of a substantially rectangular parallelopiped box and receives seven cartridges 31 therein similar to the crown stocker 1. Lifting an arm in the box by lifting means allows the cartridge 31 to project out from an upper hole of the heel stocker 3. The cartridge 31, lifting means, means for taking a heel out of the cartridge 31, means for detecting the position of the cartridge 31 and other means are all similar to those in the crown automatic preparation section CS.

Figure 7:
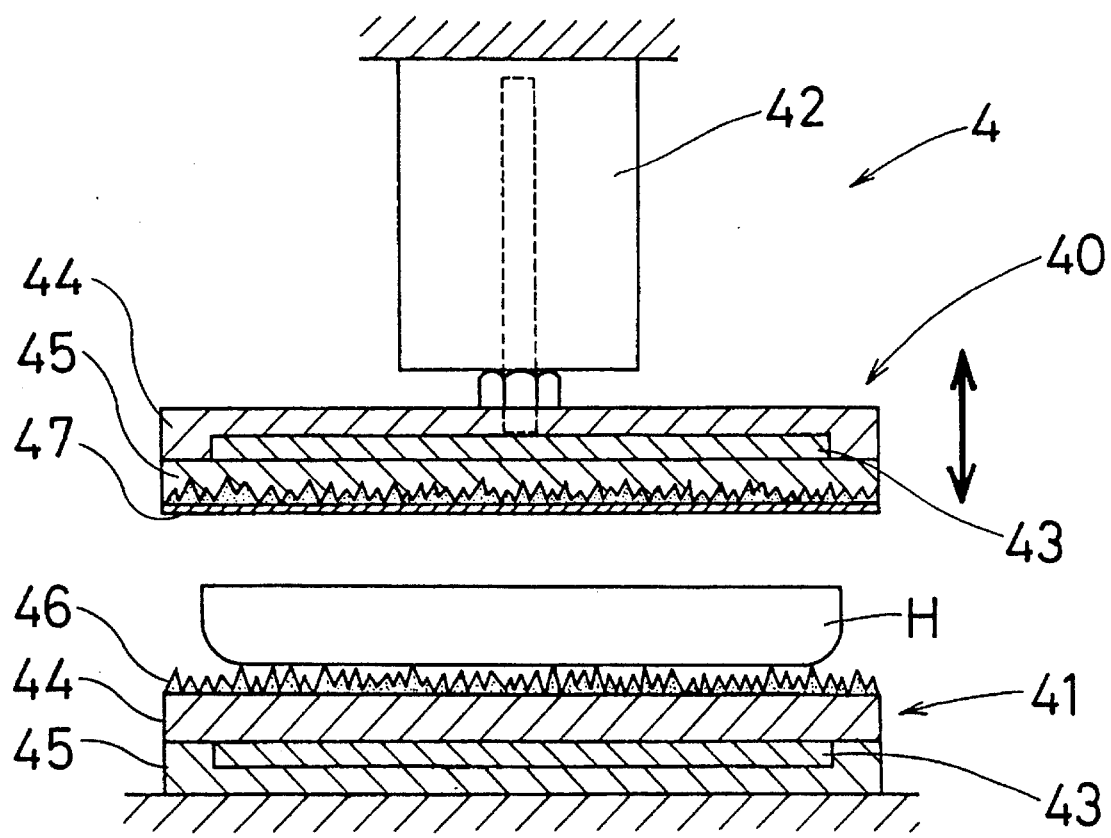
FIG. 7 is a partial section view of a heel toasting device provided in the sandwich preparation apparatus according to the present invention.
Figure 8:
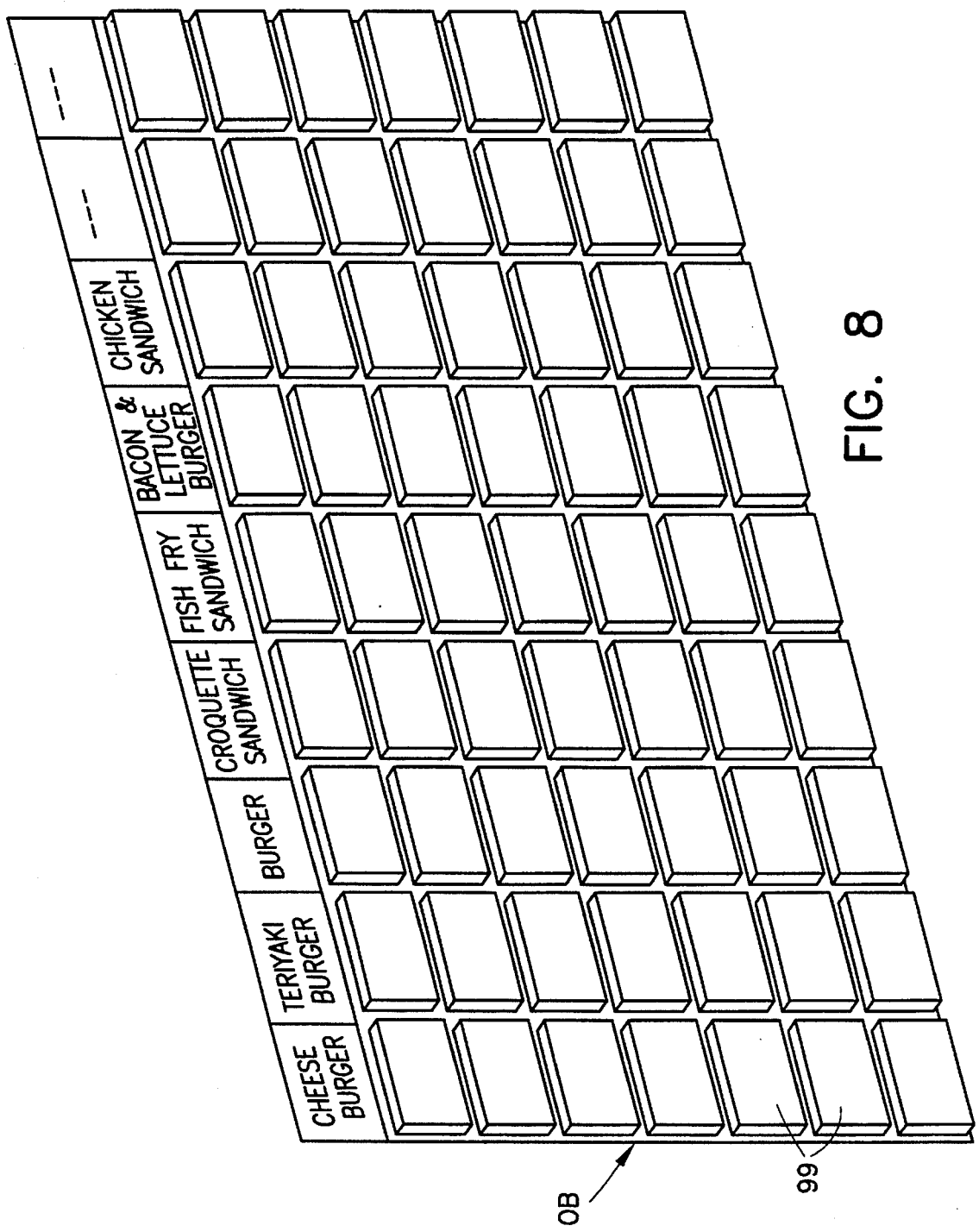
FIG. 8 is a perspective view of a display board of the sandwich preparation apparatus according to the present invention.

Referring to FIG. 7, the heel toasting device 4 toasts heel H by heating and pressing it between a pair of upper and lower heating plates 40 and 41, which are substantially parallel and disposed vertically. The heating plates 40, 41 each include upper and lower metal plates 44,45 and a heater 43 inserted therebetween. Two pressing surfaces, that is, a bottom face of the upper heating plate 40 and a top face of the lower heating plate 41, are flat. In order to obtain as satisfactory effect as in the crown toasting device 2, the pressing surface of the upper heating plate 40 includes a layer 47 similar to layer 27 on the flat face 21a, while the pressing surface of the lower heating plate 41 includes a layer 46 similar to layer 26 on the recess portion 20a.

Heels H toasted by the toasting device 4 are shifted to a conveying zone of the conveying device 7H by conventional means, such as, for example, by a pushing arm (not shown) fixed to an output shaft end of a cylinder (not shown).

The Conveying Device 7H for Heels H

Referring to FIG. 2, the structure of the conveying device 7H is similar to the conveying device 7C except for being formed in an L-shape. A downstream end of the conveyer is provided with a stopper (not shown) for stopping heels H on the moving conveyer. The stopper is actuated to open and close by a torque actuator. When the stopper is put in a closed state, heels H accumulate there and the area storing these accumulating heels becomes storage section 8H. In this embodiment, six heels can accumulate and be stored in the storage section 8H.

The Automatic Patty Preparation Section PS

Referring back to FIGS. 1 and 2, the automatic patty preparation section PS discharges patties P from a patty stocker 5 one by one and in sequence and a patty grilling device 6 heats or grills these patties.

Figure 9:
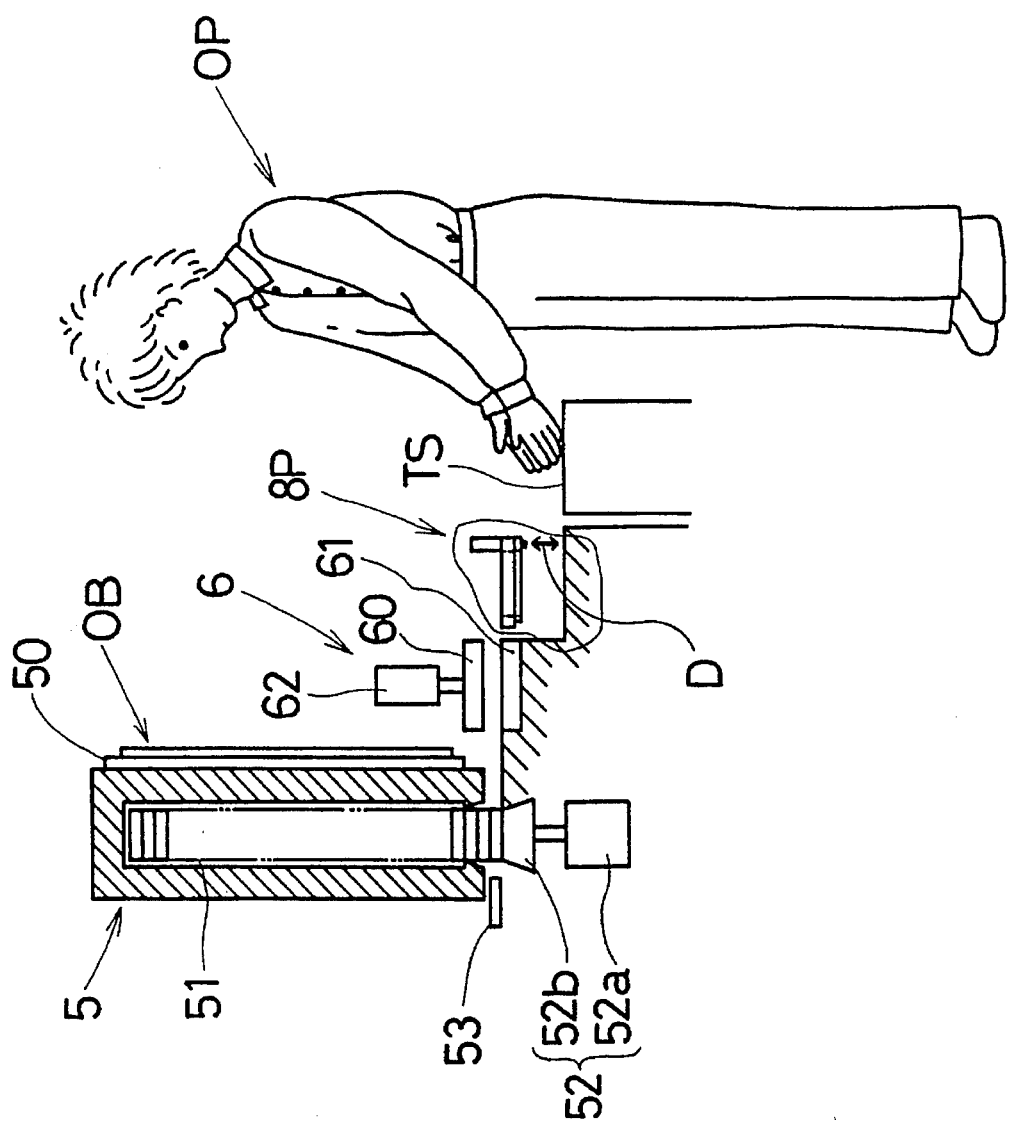
FIG. 9 is an explanatory view showing a manual preparation section of the sandwich preparation apparatus according to the present invention.

Referring to FIGS. 1 and 9, the patty stocker 5 includes a substantially rectangular parallelopiped box. This box has an openable cover 50 and accommodates at least one freezing chamber 51 therein, and preferably four freezing chambers 51. Patties P are stacked in respective chambers 51 and are supported by a lifting unit 52.

The lifting unit 52 includes a cylinder 52a and a stopper 52b. The stopper 52b is attached to an end of an output shaft of the cylinder 52a so as to be vertically movable. When discharging a patty P, the stopper 52b lowers to a position where only one bottom patty of the stack in the freezing chamber 51 comes below a bottom surface of the patty stocker 5. After the discharge of patty P, the stopper 52b returns to the original raised position to cover the bottom surface of the patty stocker 5. This allows easy and proper control of the inside temperature of the freezing chamber 51.

The patty stocker 5 includes an arm 53 driven by conventional means (not shown), such as a cylinder, for pushing a bottom patty P out from the patty stocker 5. The arm 53 facilitates smoothly shifting the patty P to the patty grilling device 6.

Furthermore, the patty stocker 5 includes display board OB on a front face of the cover 50. In response to an input from an operator or other person who receives an order, the display board OB lights up a switching LED (light emitting diode) 99 corresponding to a type of ordered sandwich. The switching LED 99 is described below. Each of the four freezing chambers 51 has one patty grilling device 6 respectively.

Figure 10:
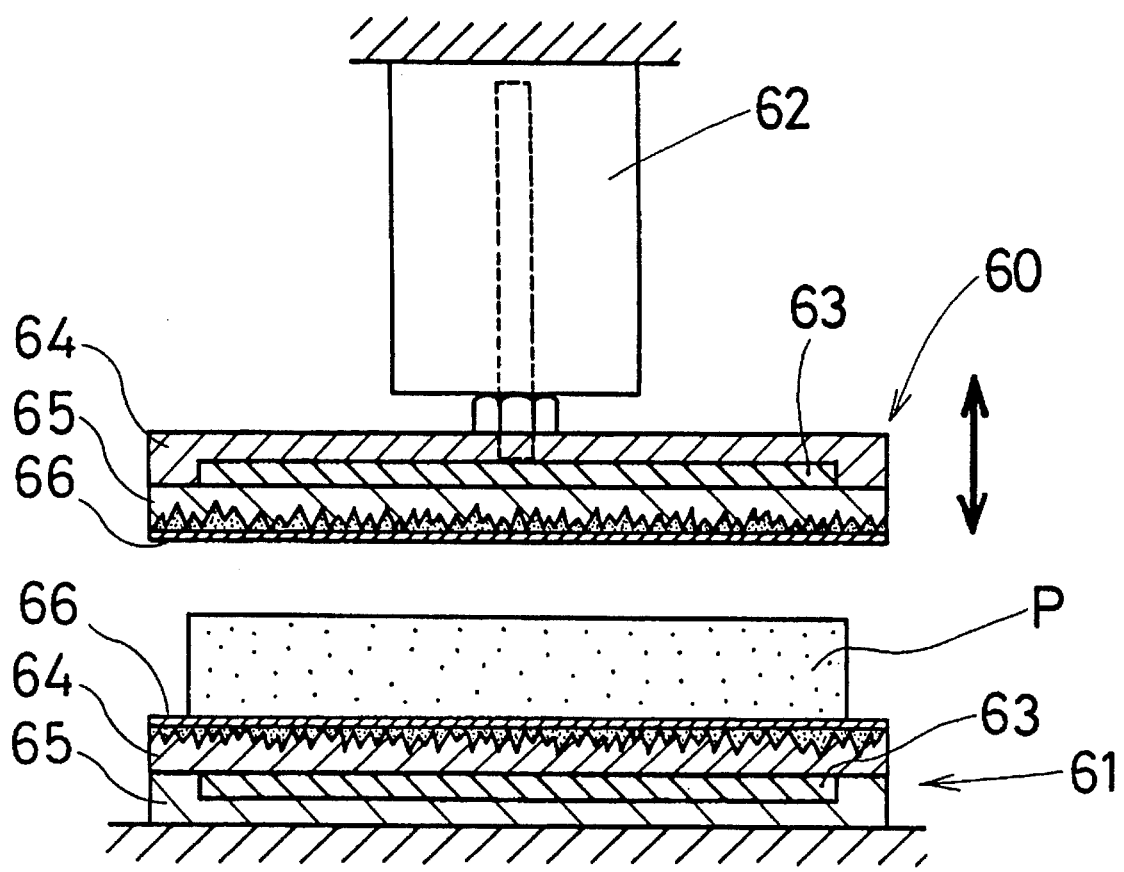
FIG. 10 is a partial section view of a patty grilling device provided in the sandwich preparation apparatus according to the present invention.

Referring also to FIG. 10, patty P is pressed and grilled between a pair of upper and a lower grilling plates 60, 61. The upper plate 60 is actuated by a cylinder 62. The grilling plates 60 and 61 each include upper and lower metal plates 64,65 and a heater 63 sandwiched therebetween. Pressing surfaces of the plates, i.e., a bottom surface of the upper plate 60 and a top surface of the bottom plate 61, each include a layer 66 which is similar to layer 27 on the flat surface 21a of the toasting device 2.

Referring now to FIG. 6, patty P grilled by the grilling device 6 is shifted to a predetermined position of the storage section 8P by a shifting means 7P. The shifting means 7P includes a cylinder 74, an output shaft of the cylinder 74, a torque actuator 72, and an arm 71. The arm 71 is at an end of the output shaft of the cylinder 74. The torque actuator 72 rotates the arm 71 to permit the transfer of the patty P from the patty stocker 5 to the patty grilling device 6.

The Patty Storage Section 8P

Figure 11:
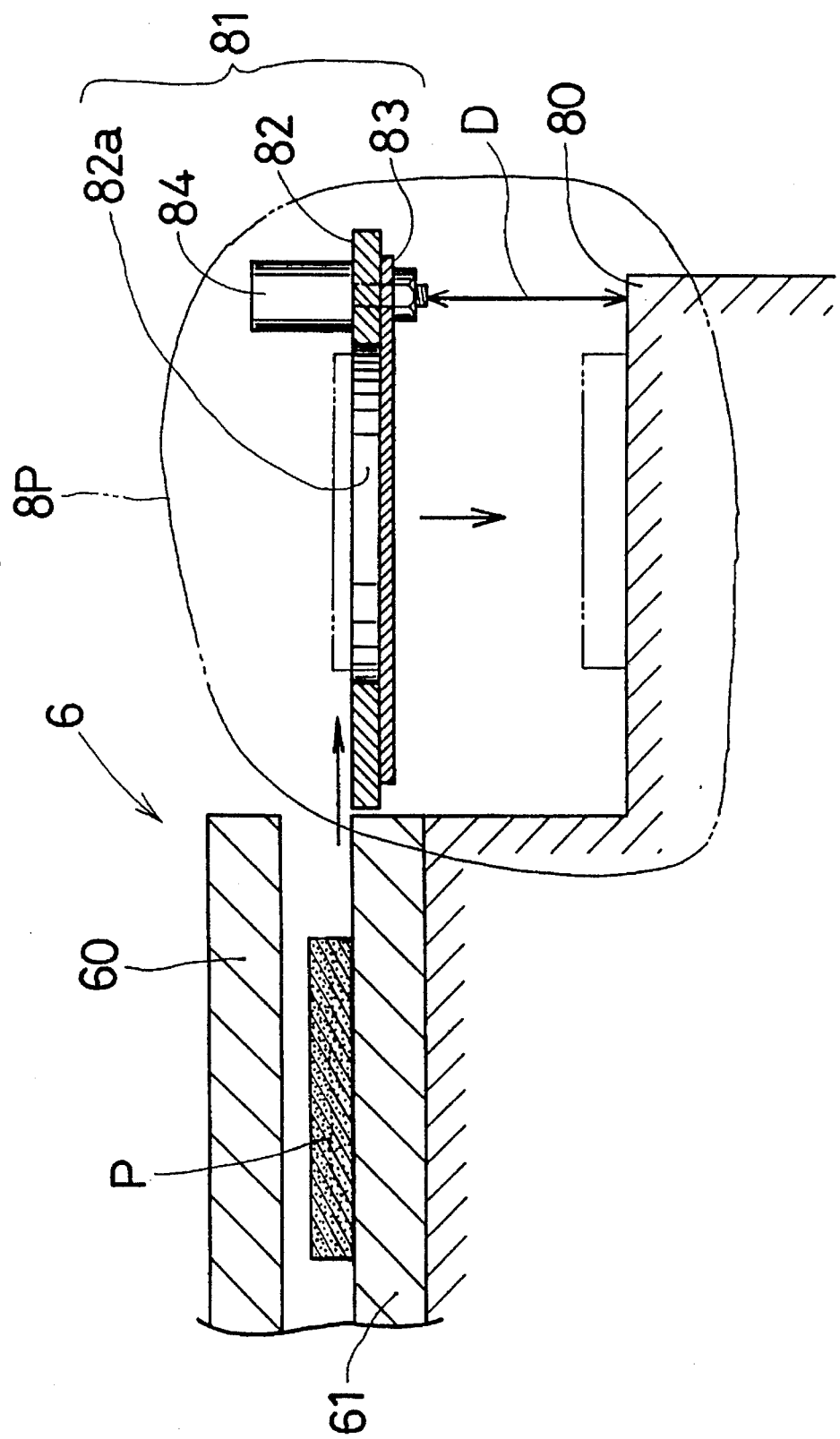
FIG. 11 is a section view of a patty storage section incorporated in the sandwich preparation apparatus according to the present invention.

Referring to FIG. 11, the storage section 8P includes a table 80 and a patty receiving means 81. The level of the surface of the table 80 is below that of the lower grilling plate 61. The level of the top surface of the patty receiving plate means 81 aligns with that of the lower grilling plate 61. As shown in FIG. 1, the width of the storage section 8P is substantially similar to that of the patty stocker 5. There is a distance D between the table 80 and the patty receiving means 81 as shown in FIGS. 9 and 11. Distance D is large enough to allow an operator OP to put his or her hand therebetween to take patty P from the table 80 and put it on the manual preparation section TS.

Figure 12:
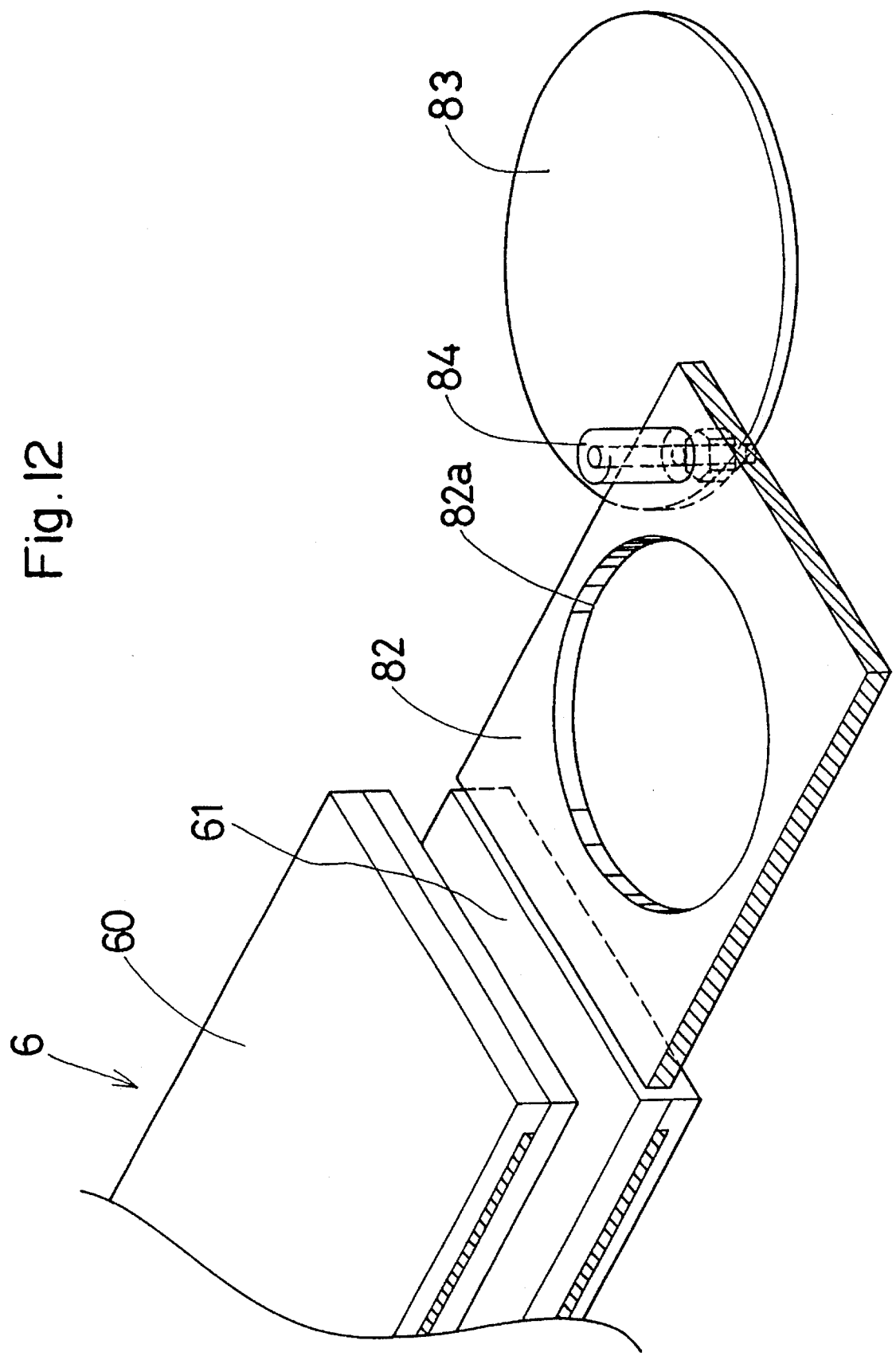
FIG. 12 is a perspective view of a patty receiving member in the patty storage section of FIG. 11.

Referring to FIGS. 11 and 12, the patty receiving means 81 includes a plate member 82, a rotatable plate 83 and an actuator 84. The plate member 82 has a hole 82a therein. The rotatable plate 83 is rotatably provided under the plate member 82 and formed to cover the hole 82a. The actuator 84 rotates the rotatable plate 83 to cover and uncover the hole 82a. Rotating the rotatable plate 83 from under the hole 82a allows patty P on the patty receiving means 81 to fall onto the table 80. More specifically, patty P is pushed by arm 71 into hole 82a where it rests on the rotatable plate 83. When rotating plate 83 rotates away from hole 82a, patty P drops through hole 82a onto table 80. In this embodiment, the rotatable plate 83 is round, but any shape and size that substantially covers hole 82a will suffice.

The Manual Preparation Section TS

Referring to FIGS. 1 and 9, the manual preparation section TS is adjacent to the storage sections 8C, 8H, and 8P within the reach of operator OP. In other words, when the operator OP stands in front of the manual preparation section TS, the storage sections 8C, 8H, and 8P are positioned to the right, left and front of the operator OP respectively. This arrangement allows the operator OP to take crowns C, heels H, and patties P from the storage sections 8C, 8H, and 8P while standing at one position and without moving about. Therefore, if other required food materials are kept near the manual preparation section TS, a variety of hamburgers and sandwiches can be readily fixed in a short time. The other necessary food materials include sauces and seasonings (such as hamburger sauce, mayonnaise, teriyaki sauce, tartar sauce, and ketchup), vegetables (such as onion, lettuce, and pickles), various kinds of cheese, fried fish, chicken, croquette and the like. A variety of hamburgers and sandwiches includes regular hamburgers, teriyaki burgers, cheese-burgers, fish sandwiches, chicken sandwiches and the like.

The Conveyer Unit 9

Referring to FIGS. 1 and 2, the conveyer unit 9 is formed in an L-shape or inverse L-shape and employs a belt as conveying means. The upstream starting end of the conveyer unit 9 is located near the manual preparation section TS, while the downstream end is located near a counter where completed sandwiches are given to customers. In other words, the upstream end is disposed at a front side of the apparatus, while the downstream end is at a rear side thereof.

Operation of the Display, Board OB, Each Preparation Section, and the Conveyer Unit An operator OP or a counter person who takes orders at a counter operates the sandwich preparation apparatus of the present invention. In response to input by the operator OP or the counter person on an entry display device (not shown), the switching LED's 99 of the display board OB corresponding to inputted ordered items light up.

The operator can prepare ordered sandwiches according to the display of the switching LED's 99 located in front of him or her. The operator also takes crown C, heel H, and patty P, if necessary, from the respective storage sections 8C, 8H, and 8P and assembles them along with other necessary food materials to complete ordered sandwiches while standing at the same position.

After completing the ordered sandwiches, the operator OP presses switching LED's 99 corresponding to the completed sandwiches. This operation is inputted into a CPU 100, and the CPU 100 sends an output to turn off the corresponding lit switching LED's 99 and activate the conveyer unit 9. This eliminates errors in preparing the kinds or numbers of sandwiches to be made. At the same time, each preparation section works as stated above to replace the crowns C, heels H, and patties P which have been removed from the storage sections 8C, 8H, and 8P and used in the completed sandwiches.

It often takes time to toast crowns C and heels H and grill patties P. This usually produces idling time for the operator OP while waiting for them to be completed. The present apparatus, however, substantially reduces or eliminates idling time because of the construction stated above.

The operative relation among the switching LED's 99 of the display board OB and each preparation section CS, HS, PS and the conveyer unit 9 is not limited to the above. For example, pressing the switching LED's 99 of completed items may only cause turning off the lit switching LED's 99 and driving the conveyer unit 9 while not activating the preparation sections CS, HS, and PS. In this case, in order to activate each preparation section CS, HS, and PS to replace used items, the apparatus may use any conventional sensing means, such as a light sensor, to detect whether there is a vacancy and activate the respective preparation sections.

Although separate conveying devices are used to transfer crowns C, heels H, and patties P from their respective toasting and grilling locations to their respective storage locations, a single conveyor device (not shown) can be used instead. In addition, a single storage section can be used to accommodate accumulating and storing crowns C, heels H, and patties P together.

By virtue of the construction described above, the sandwich preparation apparatus of the present invention can produce a variety of hamburgers and sandwiches, be installed in a relatively small conventional kitchen, and heighten productivity.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A sandwich preparation apparatus, comprising:

an automatic crown preparation section including a crown stocker and a crown toasting device;

said automatic crown preparation section including means for discharging a crown from said crown stocker;

said automatic crown preparation section including means for toasting said crown with said crown toasting device;

an automatic heel preparation section including a heel stocker and a heel toasting device;

said automatic heel preparation section including means for discharging a heel from said heel stocker;

said automatic heel preparation section including means for toasting said heel with said heel toasting device;

an automatic patty preparation section having a patty stocker and a patty grilling device;

said automatic patty preparation section including means for discharging a patty from said patty stocker;

said automatic patty preparation section including means for heating said patty with said grilling device;

a manual preparation section, wherein a sandwich is assembled manually by assembling at least said crown, said heel, and a food material; and at least one conveying device including means for transferring at least one of said crown, said heel, and said patty from at least one of said automatic crown preparation section, said automatic heel preparation section, and said automatic patty preparation section, respectively, substantially to said manual preparation section.

2. A sandwich preparation apparatus according to claim 1, further comprising:

said transferring means including at least one storage section for accumulating and storing a plurality of heels, crowns, and patties transferred by said at least one conveying device; and means, responsive to a removal by an operator of at least one of said plurality of heels, crowns, and patties from said at least one storage section, for replacing that removed one of said plurality of heels, crowns, and patties.

3. A sandwich preparation apparatus according to claim 2, wherein said replacing means is controlled by a CPU.

4. A sandwich preparation apparatus according to claim 2, wherein said replacing means is controlled by said operator.

5. A sandwich preparation apparatus according to claim 1, further comprising:

a conveyer unit;

said conveyor unit having an upstream starting region and a downstream end region;

said upstream region being near said manual preparation section;

said downstream end region being at a desired position; and said conveyer unit being driven in response to an input from an operator.

6. A sandwich preparation apparatus according to claim 1, further comprising:

a display board for displaying a plurality of types of ordered sandwiches; and said display board including a display responsive to an input from an operator.

7. A sandwich preparation apparatus, comprising:

an automatic crown preparation section including a crown stocker and a crown toasting device;

said automatic crown preparation section including means for discharging a crown from said crown stocker;

said automatic crown preparation section including means for toasting said crown with said crown toasting device;

an automatic heel preparation section including a heel stocker and a heel toasting device;

said automatic heel preparation section including means for discharging a heel from said heel stocker;

said automatic heel preparation section including means for toasting said heel with said heel toasting device;

an automatic patty preparation section having a patty stocker and a patty grilling device;

said automatic patty preparation section including means for discharging a patty from said patty stocker;

said automatic patty preparation section including means for heating said patty with said grilling device;

a manual preparation section, wherein a sandwich is assembled manually by assembling at least said crown, said heel, and a food material;

a crown conveying device including means for transferring said crown from said automatic crown preparation section substantially to said manual preparation section;

a heel conveying device including means for transferring said heel from said automatic heel preparation section substantially to said manual preparation section; and a patty conveying device including means for transferring said patty from said automatic patty preparation section substantially to said manual preparation section.

8. A sandwich preparation apparatus according to claim 7, further comprising:

said crown transferring means including a storage section for accumulating and storing a plurality of crowns transferred by said crown conveying device;

said heel transferring means including a storage section for accumulating and storing a plurality of heels transferred by said heel conveying device;

said patty transferring means including a storage section for accumulating and storing a plurality of patties transferred by said patty conveying device; and means, responsive to a removal by an operator of one of said plurality of heels, crowns, and patties from one of said storage sections, for replacing that removed one of said plurality of heels, crowns, and patties.

* * * * *